(12) United States Patent
O'Neill

(10) Patent No.: US 10,709,113 B2
(45) Date of Patent: Jul. 14, 2020

(54) ANIMAL TRAINING HARNESS

(71) Applicant: Jessica Eden O'Neill, Ottawa (CA)

(72) Inventor: Jessica Eden O'Neill, Ottawa (CA)

( * ) Notice: Subject to any disclaimer, the term of this patent is extended or adjusted under 35 U.S.C. 154(b) by 324 days.

(21) Appl. No.: 15/793,211

(22) Filed: Oct. 25, 2017

(65) Prior Publication Data

US 2018/0110206 A1  Apr. 26, 2018

Related U.S. Application Data

(60) Provisional application No. 62/412,958, filed on Oct. 26, 2016.

(51) Int. Cl.
*A01K 27/00* (2006.01)
*A01K 15/02* (2006.01)

(52) U.S. Cl.
CPC ......... *A01K 27/002* (2013.01); *A01K 15/02* (2013.01)

(58) Field of Classification Search
CPC .... A01K 27/002; A01K 27/00; A01K 27/005; A01K 15/02
See application file for complete search history.

(56) References Cited

U.S. PATENT DOCUMENTS

| | | | | |
|---|---|---|---|---|
| 5,247,905 A * | 9/1993 | Arakawa | ............ | A01K 27/002 119/863 |
| 7,165,511 B1 * | 1/2007 | Brezinski | ............ | A01K 27/002 119/792 |
| 7,891,322 B2 * | 2/2011 | Bennett | ............ | A01K 27/005 119/856 |
| 8,051,808 B2 * | 11/2011 | Mugford | ............ | A01K 27/002 119/771 |
| 8,171,892 B1 * | 5/2012 | Horgan | ............ | A01K 27/002 119/792 |
| 9,089,110 B2 * | 7/2015 | Lai | ............ | A01K 27/003 |
| 9,247,716 B2 * | 2/2016 | Wilson | ............ | A01K 27/002 |
| 9,456,586 B1 * | 10/2016 | Lady | ............ | A01K 15/02 |
| 9,491,931 B2 * | 11/2016 | Yamin | ............ | A01K 27/002 |
| 2004/0000273 A1 * | 1/2004 | Lady | ............ | A01K 27/002 119/792 |
| 2008/0105216 A1 * | 5/2008 | Sporn | ............ | A01K 27/002 119/863 |

(Continued)

FOREIGN PATENT DOCUMENTS

| | | | | |
|---|---|---|---|---|
| CA | 2809397 A1 * | 9/2014 | ............ | A01K 27/001 |
| DE | 202014008414 U1 * | 11/2014 | ............ | A01K 27/00 |

(Continued)

*Primary Examiner* — Kathleen I Alker

(74) *Attorney, Agent, or Firm* — Rosenberg, Klein & Lee

(57) ABSTRACT

An animal leash is typically connected to a collar worn around the neck of an animal, where for untrained animals who instinctively wish to roam away from its handler, this leads to the animal pulling the leash taut. However, many animals have an opposition reflex that makes them instinctively move toward the part of their bodies on which they feel pressure. This leads to the animal pulling harder on the leash as the pressure of the leash is at its neck. Accordingly, it would be beneficial to provide a harness that applies pressure to the opposite side of the animal with respect to the direction it is seeking to wander away from a user holding a leash. Such a leash would apply pressure triggering the opposition reflex bringing the animal back into line.

13 Claims, 5 Drawing Sheets

(56) References Cited

U.S. PATENT DOCUMENTS

| | | | |
|---|---|---|---|
| 2016/0007570 A1* | 1/2016 | Stout | A01K 27/002 119/856 |
| 2016/0183496 A1* | 6/2016 | Wilson | A01K 27/002 119/719 |
| 2017/0196200 A1* | 7/2017 | Wilson | A01K 27/002 |
| 2017/0280685 A1* | 10/2017 | McCain | A01K 27/002 |
| 2019/0075760 A1* | 3/2019 | Porter | A01K 27/003 |

FOREIGN PATENT DOCUMENTS

| | | | | |
|---|---|---|---|---|
| DE | 102015004714 B3 * | 6/2016 | | A01K 27/002 |
| EP | 1033075 A1 * | 9/2000 | | A01K 27/002 |
| WO | WO-2009025018 A1 * | 2/2009 | | A01K 27/002 |

* cited by examiner

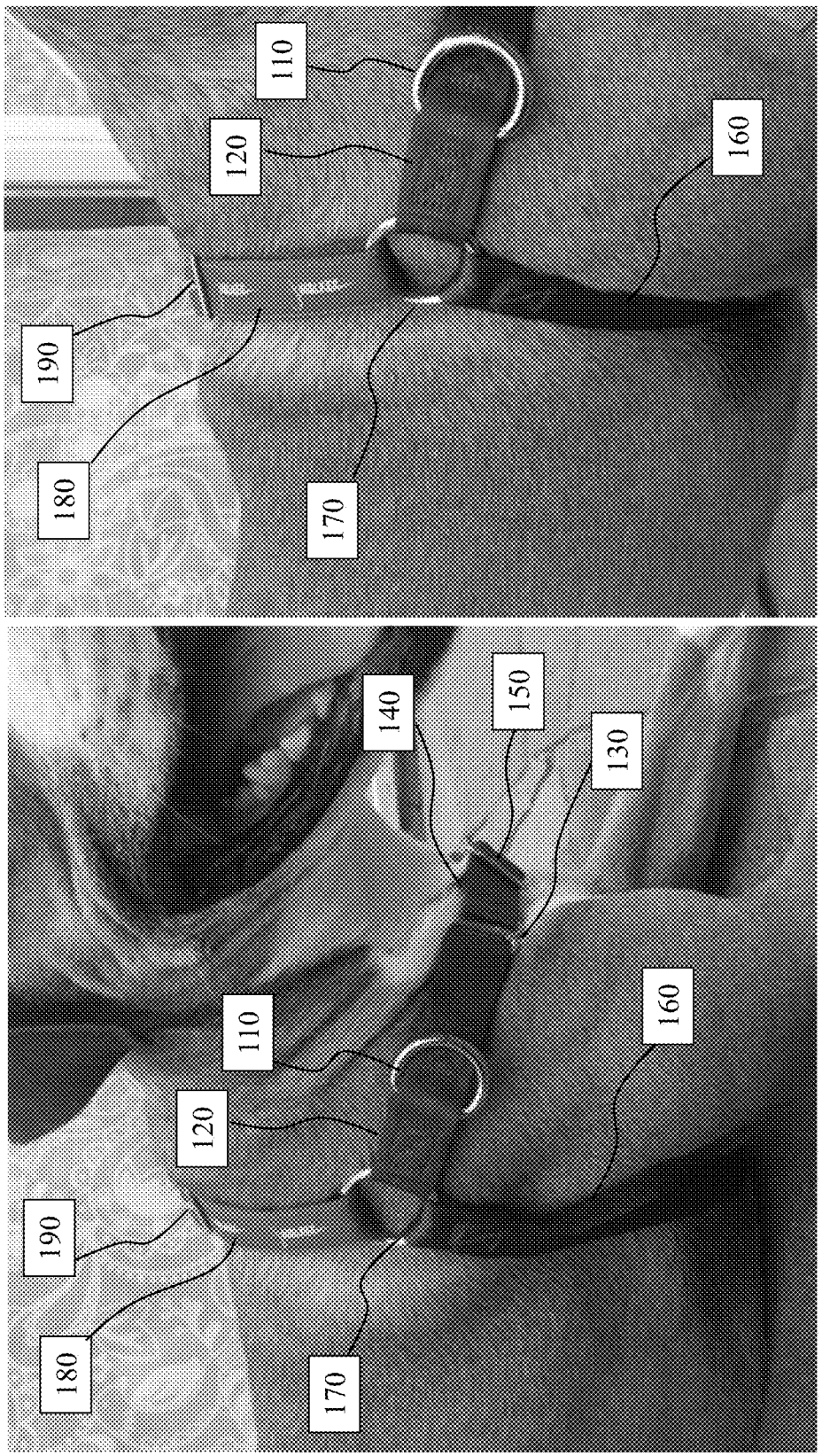

ANIMAL TRAINING HARNESS

CROSS-REFERENCE TO RELATED APPLICATIONS

This patent application claims the benefit of priority from U.S. Provisional Patent Application 62/412,958, filed 26 Oct. 2016, entitled "Animal Tracking Harness", currently pending, the entire contents of which are herein incorporated by reference.

FIELD OF THE INVENTION

This invention relates to animal harnesses and more particularly to animal harnesses to teach an animal its direction of motion relative to an individual coupled to the animal harness via a leash.

BACKGROUND OF THE INVENTION

An animal leash is typically connected to a collar worn around the neck of an animal and is free to rotate around the neck. An animal, such as a dog, that has not been trained, instinctively wishes to roam away from its handler. When the dog tries to walk or run away and pulls the leash taut, the collar is automatically rotated so that the leash is positioned at the back of the neck. As the dog pulls the leash taut, it feels pressure on the front of its neck.

Many animals have an opposition reflex that makes them instinctively move toward the part of their bodies on which they feel pressure. Since the dog feels pressure at the front part of the collar when he pulls on a leash that has been rotated to the back, the collar encourages the dog to pull away from its handler with even greater force. As another example, the opposition reflex of a horse causes it to turn towards the side where the rider's leg applies pressure.

In addition to collars, there are animal harnesses that wrap around the torso. A typical harness has a leash attachment at the back of the animal, but a back-mounted leash cannot be used to give the animal cues for learning how to walk and not drift left or right. The back-mounted leash also signals the animal to pull on the leash, similar to a neck collar, because of the pressure on the front of the chest when the animals pulls the leash taut. Some prior art harnesses discourage pulling behavior by providing devices that rub, chafe, or hobble the animal's front legs, but these devices cause stress and discomfort.

Accordingly, it would be beneficial to provide a harness that applies pressure to the opposite side of the animal with respect to the direction it is seeking to wander away from a user holding a leash. Such a leash would apply pressure triggering the opposition reflex bringing the animal back into line.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to animal harnesses and more particularly to animal harnesses to teach an animal its direction of motion relative to an individual coupled to the animal harness via a leash.

In accordance with an embodiment of the invention there is provided a method of applying pressure to a predetermined portion of a side of an animal via a harness worn by the animal wherein the side of the animal is determined by a direction of motion of the animal away from a user holding a leash attached to the harness.

In accordance with an embodiment of the invention there is provided a harness comprising:
a first harness assembly providing a first adjustable strap around the back and waist of an animal;
a second harness assembly comprising a first Martingale assembly attached to a first predetermined location on one side of the harness, a second Martingale assembly attached to a second predetermined location on the other side of the harness, and a second adjustable strap coupled to the first and second Martingale assemblies, wherein
when worn by the animal the first assembly is intended to be positioned just behind the front legs of the animal and the second harness assembly is intended to be positioned around the front of the animal proximate its collar bone; and
the harness provides pressure to either the left or right side of the animal through the action of at least one of the first Martingale assembly and the second Martingale assembly based upon motion of the animal away from a user holding a leash attached to the harness via the first and second Martingale assemblies.

In accordance with an embodiment of the invention there is provided a harness assembly comprising:
a first Martingale assembly for attachment at an end of the first Martingale assembly to a first predetermined location on a harness;
a second Martingale assembly for attachment at an end of the second Martingale assembly to a second predetermined location on the harness; and
an adjustable strap coupled to the other end of the first Martingale assembly and the other end of the second Martingale assembly; wherein
when the harness and harness assembly are worn by the animal the harness assembly is situated proximate the animal's collar bone and motion of the animal either to the left or right away from a user holding a leash attached to the harness via the first and second Martingale assemblies results in pressure being applied to one side of the animal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 5 and 6 depicts alternate right side views of a harness according to an embodiment of the invention in position upon a dog as depicted in FIGS. 1 to 4 respectively;

DETAILED DESCRIPTION

Figure 2:
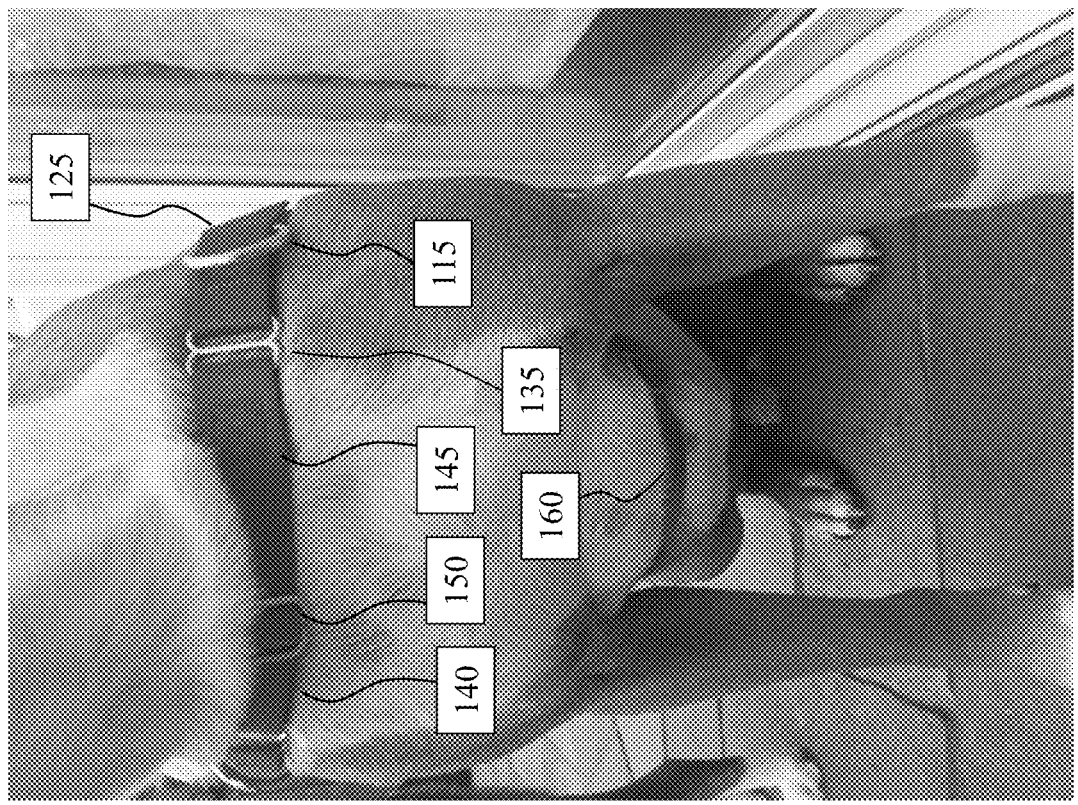
FIG. 2 depicts a second slightly offset front view of a harness according to an embodiment of the invention in position upon a dog as depicted in FIG. 1.

The present invention is directed to animal harnesses and more particularly to animal harnesses to teach an animal its direction of motion relative to an individual coupled to the animal harness via a leash.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device according to an embodiment of the invention within some embodiments of the invention may have either specific meaning, limited meaning or no specific meaning as elements of the device may be employed in alternate orientations upon the animal and achieve the same desired objective. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

References to left, right, top, bottom, front and back within the following descriptions are based upon an assumption of an animal wearing the harness being ahead of a user who is coupled to the harness and therein the animal via a leash. Accordingly, these terms have the same frame of reference as the user themselves.

A "harness" as used herein and throughout this disclosure, refers to a restraint or support which comprises a series of looped element to fit around defined regions of an animal. Some harnesses may be worn in conjunction with a collar, others without a separate collar, and may be used for leash attachment. A harness will typically have a collar that encircles the neck, and one or more loops that surround the torso as well, with connecting straps between them for reinforcement. A harness may allow for distribution of force which may prevent choking and a lower chance of slipping out than may be possible with only a collar. A harness may be formed from a range of materials provided that they meet the required strength, weight, resiliency, cost, etc. of the manufacturer and their intended use. For example, common materials for harnesses include, but are not limited to, leather, polyester, polypropylene, and nylon. Fiber based materials such as nylon, polyester, and polypropylene may be employed in different formats such as those referred to as "flat nylon" and "tubular nylon" tape or webbing. A harness may be used for general "walking"/exercise of an animal, e.g. a dog, or it may be used to train the behaviour of an animal, e.g. training them to walk with their owner.

"Webbing" as used herein and throughout this disclosure, refers to a strong fabric woven as a flat strip or tube of varying width and fibres. Webbing may be formed from natural materials such as cotton, flax, abaca, silk, and hemp as well as synthetic fibers such as nylon, polypropylene and polyester. Other fibers such as high-strength materials including Dyneema™, formed from ultra-high molecular weight polyethylene (UHMWPE), and Kevlar™, a para-aramid fiber. Webbing may include, but not be limited to, flat webbing which is a solid weave, of which seatbelts and backpack straps are common applications and tubular webbing which consists of a flattened tube, is commonly used in climbing and industrial applications.

A "leash" (also called a lead, lead line or tether) as used herein and throughout this disclosure, refers to a rope, cable, or similar material attached to the neck or head of an animal for restraint or control. On the animal, a leash may be clipped or tied to a collar, harness, or halter, whilst others may go directly around the animal's neck. A leash may for formed from a variety of variety of materials including, a metal chain, a soft leather or braided leather leash with a loop handle and a clip to attach to the collar, a nylon webbing leash, an extended length and a nylon webbing leash. Leashes may include short leashes, extended length leashes, slip leashes (usually with a loop handle and an adjustable, slipping loop at the other end that goes around the dog's neck), and retractable (typically a hook on a thin rope that retracts automatically into a large plastic handle).

A "ring" as used herein and throughout this disclosure, refers to a solid loop of material which can be formed from materials having suitable mechanical properties according to the requirements of strength, brittleness, etc. including, but not limited, to a metallic element, an alloy, a plastic, wood, and a gemstone.

A "clasp" as used herein and throughout this disclosure, refers to a type of fastener being a hardware device that mechanically joins or affixes two or more objects together.

A "buckle clasp" as used herein and throughout this disclosure, refers to a type of fastener employed for fastening two loose ends of a strap, belt, loop etc. A buckle clasp is typically formed by a male buckle member (the hook end) and a female buckle member (the catch end) allowing the attachment to be formed in a secure but adjustable manner.

A "side release clasp" as used herein and throughout this disclosure, refers to clasp where the male buckle member consists of a center guide rod forwardly extending from the front side with two spring arms equally spaced from the center rod. The two spring arms each have a retaining block that terminates at the front end. The female buckle member has a front open side and two side holes which hold and secure the two spring arms of the male buckle member.

A "fabric" as used herein and throughout this disclosure, refers to a flexible material consisting of a network of natural or artificial fibres (yarn or thread).

An "animal" as used herein and throughout this disclosure, refers to a living organism with well-defined shape, usually limited growth, ability to move voluntarily, actively acquire food and digest it internally, and have sensory and nervous systems that allow them to respond rapidly to stimuli. An animal may include, but not be limited to, a dog, a cat, a rabbit, a donkey, a horse, and a goat.

A "user" as used herein may refer to, but is not limited to, an individual or group of individuals. This includes, but is not limited to, private individuals, employees of organizations and/or enterprises, members of community organizations, members of charity organizations, men. women and children. In its broadest sense the user may further include, but not be limited to, mechanical systems, robotic systems, android systems, etc. that may be characterised by an ability to exploit one or more embodiments of the invention.

TABLE 1

Listing of Elements

| Reference Numeral | Item Description | Item Shortform |
|---|---|---|
| 110 | Right Leash Attachment Ring | ATT-RING-RHS |
| 115 | Left Leash Attachment Ring | ATT-RING-LHS |
| 120 | Right Martingale Loop | MG-LOOP-RHS |
| 125 | Left Martingale Loop | MG-LOOP-LHS |
| 130 | Right Collar Buckle | CLR-BK-RHS |
| 135 | Left Collar Buckle | CLR-BK-LHS |
| 140 | Collar Strap (Right Hand Side Portion) | COL-STRP-RHS |
| 145 | Collar Strap (Left Hand Side Portion) | COL-STRP-LHS |
| 150 | Collar Strap Adjust Buckle | COL-STRP-ADJ |
| 160 | Chest Strap (Right Hand Side Portion) | CHST-STRP-RHS |
| 165 | Chest Strap (Left Hand Side Portion) | CHST-STRP-LHS |
| 170 | Right Strap Ring | STRP-RING-RHS |
| 175 | Left Strap Ring | STRP-RING-LHS |
| 180 | Back Strap (Right Hand Side Portion) | BK-STRP-RHS |
| 185 | Back Strap (Left Hand Side Portion) | BK-STRP-LHS |
| 190 | Back Strap Adjust Buckle | BK-STRP-ADJ |
| 200 | Side Release Buckle | SD-REL |
| 200A | Side Release Buckle - Housing | SD-REL-HSE |
| 200B | Side Release Buckle - Release Clip | SD-REL-CLP |
| 210 | Chest Strap Adjust Buckle | CHST-STRP-ADJ |

Figure 1:
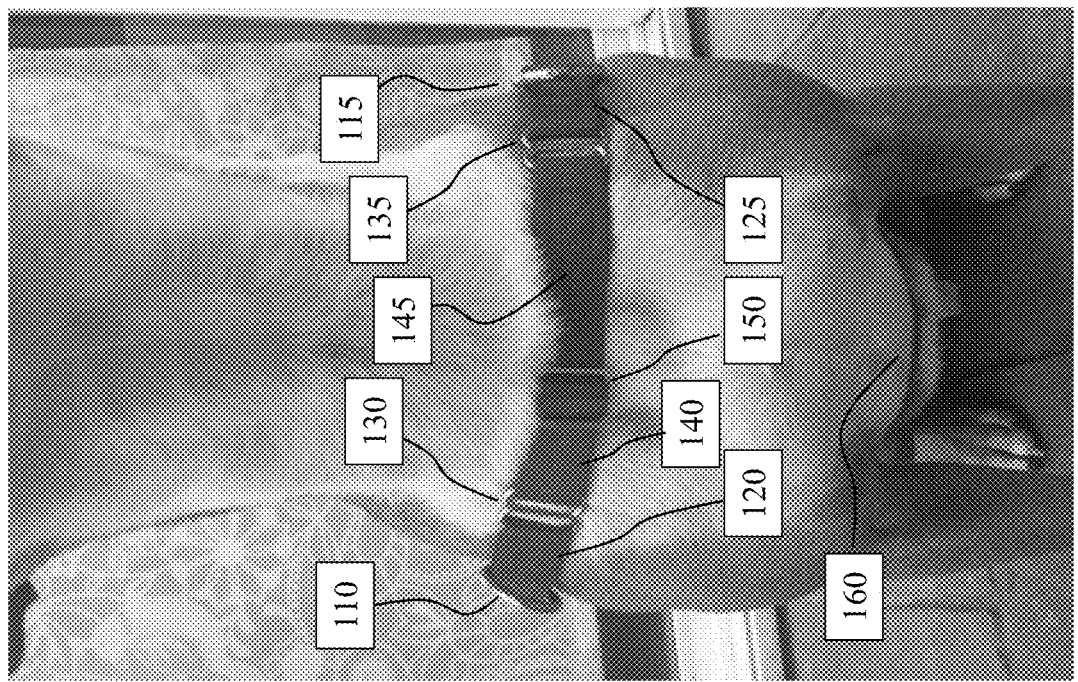
FIG. 1 depicts a first front view of a harness according to an embodiment of the invention in position upon a dog.

Referring to FIGS. 1 and 2 respectively there are depicted first and second front views of a harness according to an embodiment of the invention in position upon a dog. As depicted a collar strap comprising a first portion, the collar strap (right hand side portion) (COL-STRP-RHS) 140, and a second portion, the collar strap (left hand side portion) (COL-STRP-LHS) 145, which are combined with a collar strap adjustment buckle (COL-STRP-ADJ) 150 to provide an adjust strap that fits across the collar of the dog, as depicted. The collar strap is attached via a right collar buckle (CLR-BK-RHS) 130 to a first Martingale loop, the right Martingale loop (MG-LOOP-RHS) 120 from the COL-STRP-RHS 140 which has attached the right leash attachment ring (ATT-RING-RHS) 110. Then via a left collar buckle (CLR-BK-LHS) 135 to a second Martingale loop, the left Martingale loop (MG-LOOP-LHS) 125 from the COL-STRP-LHS 145 which has attached the left leash attachment ring (ATT-RING-LHS) 115. A first portion of a leash, not shown for clarity, would attach to the ATT-RING-RHS 110 whilst a second portion of the leash, also not shown for clarity, would attach to the ATT-RING-LHS 115.

Figure 4:
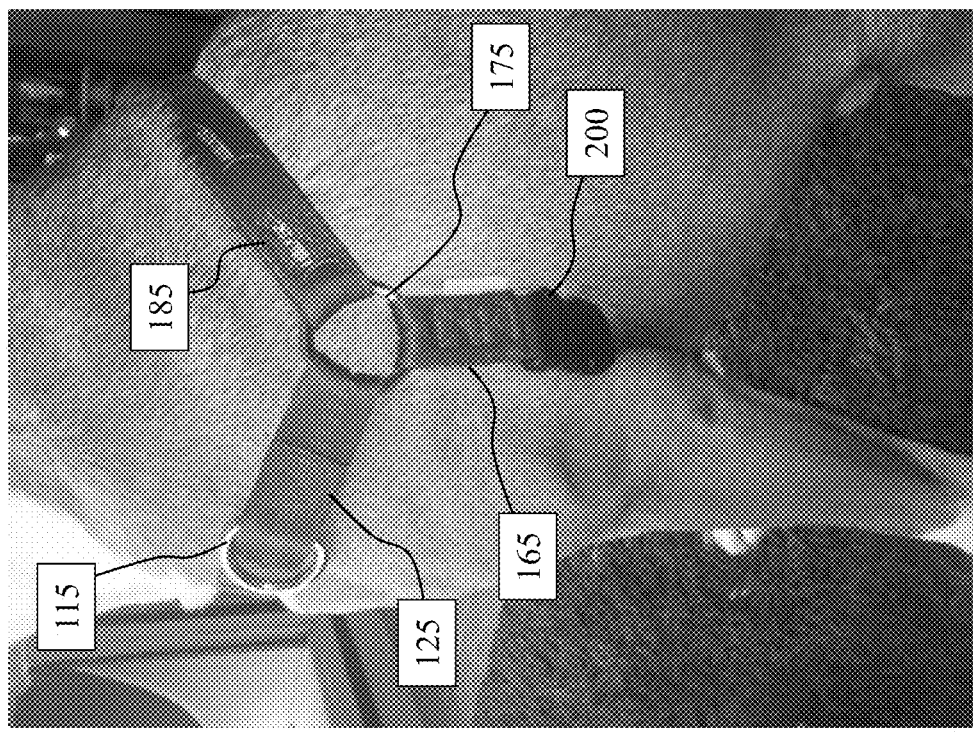
FIGS. 3 and 4 respectively depict right side and left side views of a harness according to an embodiment of the invention in position upon a dog as depicted in FIGS. 1 and 2.
Figure 3:
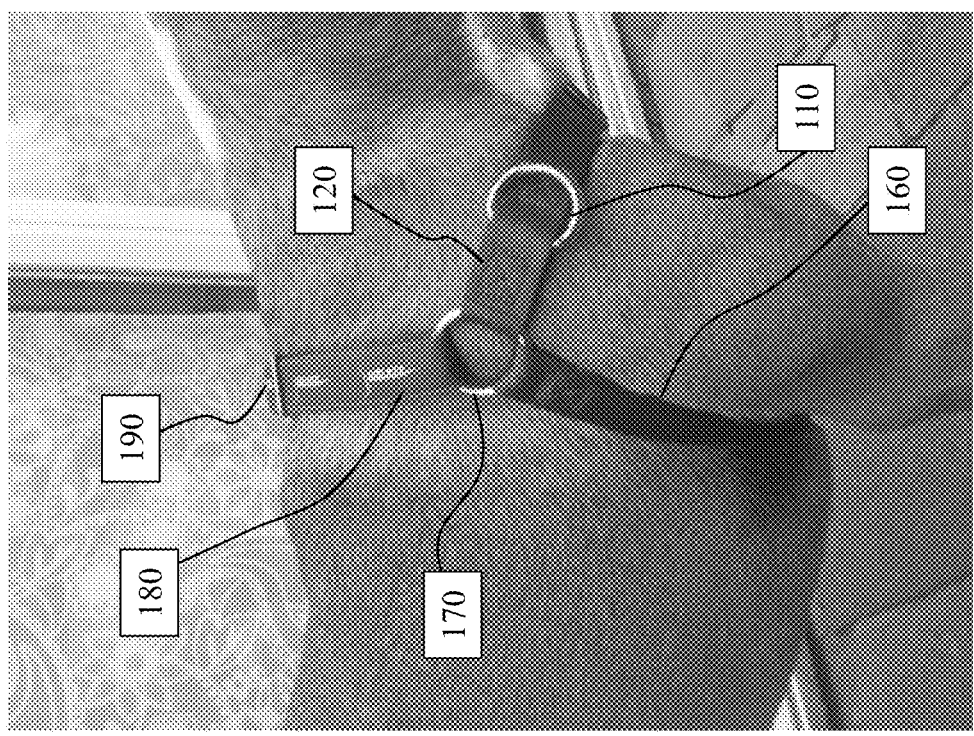
Figure 7:
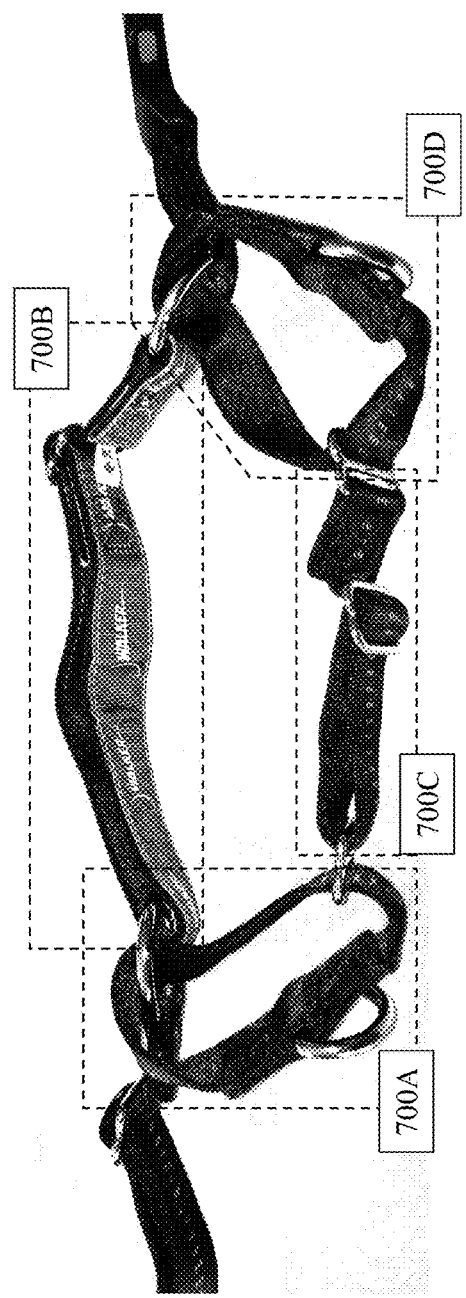
FIGS. 7 to 10 are images of the harness prior to being worn by a dog depicting the structure of the harness according to an embodiment of the invention as depicted in FIGS. 1 to 6 respectively.
Figure 8:
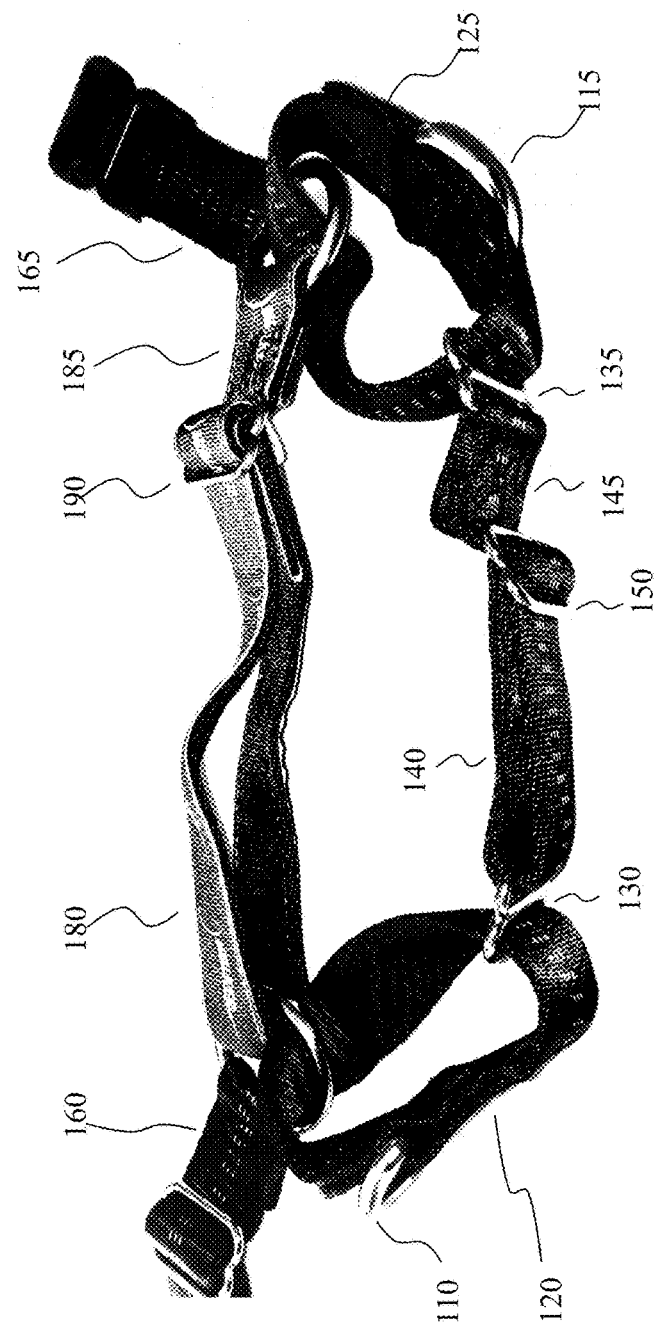

Now referring to FIGS. 3 and 4 respectively there are depicted right side and left side views of a harness according to an embodiment of the invention in position upon a dog as depicted in FIGS. 1 and 2. Accordingly, considering initially FIG. 3 then the MG-LOOP-RHS 120 is depicted with its ATT-RING-RHS 110 to the side of the dog's collar bone region above the legs and their joints to the body and below the neck. The MG-LOOP-RHS 120 is attached to a right strap ring (STRP-RING-RHS) 170 to which are also attached a right hand portion of a back strap (BK-STRP-RHS) 180 and right hand portion of a chest strap (CHST-STRP-RHS) 160. Visible at the top of the dog's back in FIG. 3 is the back strap adjustment buckle (BK-STRP-ADJ) 190. Similarly FIG. 4 depicts MG-LOOP-LHS 125 with its ATT-RING-LHS 115 to the side of the dog's collar bone region above the legs and their joints to the body and below the neck. The MG-LOOP-LHS 125 is attached to a left strap ring (STRP-RING-LHS) 175 to which are also attached a left hand portion of a back strap (BK-STRP-LHS) 185 and left hand portion of a chest strap (CHST-STRP-LHS) 165. The CHST-STRP-LHS 165 couples to the CHST-STRP-RHS 160 via side release buckle 200. A chest adjustment buckle is not visible in FIGS. 3 and 4 but is depicted in FIGS. 7-10.

Referring to FIGS. 5 and 6 there are depicted alternate right side views of a harness according to an embodiment of the invention in position upon a dog as depicted in FIGS. 1 to 4 respectively. Accordingly, it is evident that a harness according to an embodiment of the invention has left and right sided strap rings, STRP-RING-RHS 170 and STRP-RING-175, that each have an end of a collar strap, a back strap, and a chest strap attached to them. Each of the three straps, namely the collar strap, the back strap, and the chest strap have an adjustment buckle, e.g. BK-STRP-ADJ 190 on the back strap, COL-STRP-ADJ 150 on the collar strap, and a chest strap adjustment buckle (CHST-STRP-ADJ) 210 (see FIGS. 7 to 10 respectively) allowing each of the collar strap, back strap, and chest strap to be adjusted for a comfortable fit for the dog. The dog's head fits through between the back strap and collar strap whilst the chest strap is undone/done up using the SD-REL 200 that forms part of it.

FIGS. 7 to 10 are images of the harness prior to being worn by a dog depicting the structure of the harness according to an embodiment of the invention as depicted in FIGS. 1 to 6 respectively. Considering FIGS. 7 and 8 then the collar strap and back strap portions of the harness are depicted. Accordingly, the back strap 700B links between the left and right side strap rings and comprises the right and left hand portions of the back strap, namely BK-STRP-LHS 185 and BK-STRP-RHS 180, together with the back strap adjustment buckle, BK-STRP-ADJ 190. The right and left Martingale loops, MG-LOOP-RHS 120 and MG-LOOP-LHS 125, and their associated leash attachment rings, ATT-RING-RHS 110 and ATT-RING-LHS 115, form first and second Martingale fixtures 700A and 700D respectively. The collar strap portion 700C is attached to the first and second Martingale fixtures 700A and 700D respectively by right and left collar buckles, CLR-BK-RHS 130 and CLR-BK-LHS 135. This comprises the right and left side collar strap portions, CLR-STRP-RHS 140 and CLR-STRP-LHS 145, and collar strap adjustment buckle, CLR-STRP-ADJ 150.

Figure 9:
Figure 10:
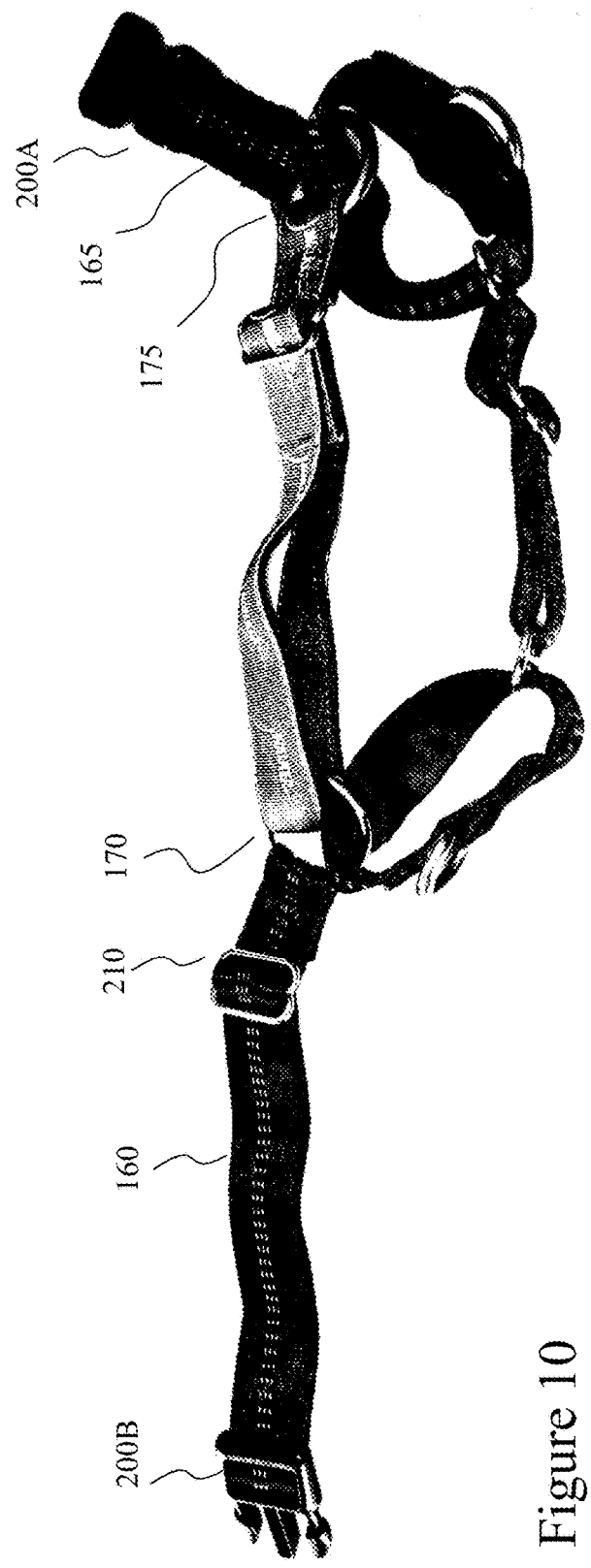

Considering FIGS. 9 and 10 then the chest strap is depicted comprising right and left portions 900A and 900B respectively which are coupled to the right and left strap rings respectively, STRP-RING-RHS 170 and STRP-RING-LHS 175. As depicted the right portion 900A comprises right chest strap portion (CHST-STRP-RHS) 160, chest strap adjustment buckle (CHST-STRP-ADJ) 210, and the side release buckle release clip (SD-REL-CLIP) 200B. The left portion 900B comprises left chest strap portion (CHST-STRP-LHS) 165 and side release buckle housing (SD-REL-HSE) 200A.

As depicted in FIGS. 1 to 10 a harness according to an embodiment of the invention is designed with three straps that join via ring. These being a strap across the collar region of the animal, a strap across the "upper back"/"shoulders" of the animal, and a strap across the chest of the animal towards their forelegs. The strap across the collar region of the animal has left and right Martingale loops at their respective sides of the animal and each has a ring. To each ring either a discrete leash is attached or an end of two-way split leash is attached. Accordingly, as the animal walks with a user if the animal pulls away to either the left or the right then the leash on that side pulls the associated ring and Martingale loop applying pressure to the animal on the side that they are pulling towards. In this manner the animal is trained over a period of time as walking away from the direction ahead with the user yields the pressure to return to the direction ahead. As such embodiments of the invention achieve training of the animal without resorting to choking the animal or stopping its walking by pinching its shoulders together as within the prior art.

Harnesses according to embodiments of the invention achieve their redirection through pressure to the side of the animal leading away from the desired path. It would be evident that within embodiments of the invention a single strap may be employed around the back and chest of the animal to which the collar strap is attached which comprises the pair of Martingale loops and central joining strap.

It would be evident that the collar strap comprising the pair of Martingale loops and central joining strap may be permanently attached to the harness such as depicted in FIGS. 1 to 10 via the rings (STRP-RING-RHS 170 and STRP-RING-LHS 175) or alternatively may be demountably attached to the harness. Optionally, the position of the collar strap onto the harness formed by the back and chest straps may be adjusted through it being demountably attached with multiple attachment points on the remainder of the harness. It would be evident that the harness may comprise additional straps beyond those described such as a second pair of back and chest straps further down the body of the animal.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An animal harness comprising:
   a first harness assembly providing a first adjustable strap configured to fit around the back and waist of an animal;
   a second harness assembly comprising:
      a first Martingale assembly attached at a first end to a first predetermined location on one side of the first harness and at a second distal end to a first end of a second adjustable strap and comprising a first leash attachment ring;
      a second Martingale assembly attached at a first end to a second predetermined location on the other side of the harness first harness and at a second distal end to a second distal end of the second adjustable strap and comprising a second leash attachment ring; and
      the second adjustable strap coupled to the first and second Martingale assemblies and configured to fit around the front of the animal, wherein
   when worn by the animal the first harness assembly is intended to be positioned just behind the front legs of the animal and the second harness assembly is intended to be positioned around the front of the animal proximate its collar bone; and
      the harness provides pressure to either the left or right side of the animal through the action of at least one of the first Martingale assembly and the second Martingale assembly based upon motion of the animal away from a user holding a leash attached to the second harness assembly via at least one of the first leash attachment ring of the first Martingale assembly and the second leash attachment ring of the second Martingale assembly.

2. The animal harness according to claim 1, wherein the first harness assembly comprises:
   a first portion of the first adjustable strap for looping around the chest of the animal attached at a first end to a first ring and at a second distal end to a second; and
   a second portion of the first adjustable strap for looping around the back of the animal attached at a first end to the first ring and at a second distal end to the second ring; wherein
   the first predetermined location on one side of the first harness to which the first Martingale assembly is attached is the first ring; and
   the second predetermined location on the other side of the first harness to which the second Martingale assembly is attached is the second ring.

3. The animal harness assembly according to claim 2, wherein the first portion of the first adjustable strap comprises a buckle.

4. The animal harness assembly according to claim 2, wherein
the first portion of the first adjustable strap comprises a first adjustment buckle;
the second portion of the first adjustable strap comprises a second adjustment buckle; and
the second adjustable strap comprises a third adjustment buckle.

5. The animal harness according to claim 1, wherein
when the animal moves to the left away from the user the pressure is applied to the right side of the animal; and
when the animal moves to the right away from the user the pressure is applied to the left side of the animal.

6. The animal harness assembly according to claim 1, wherein in use the user holding the leash attached to the second harness assembly via at least one of the first leash attachment ring of the first Martingale assembly and the second leash attachment ring of the second Martingale assembly is beside or behind the animal.

7. The animal harness assembly according to claim 1, wherein the second adjustable strap fits across the front of the animal above its shoulders.

8. An animal harness assembly comprising:
a first Martingale assembly attached at a first end to a first predetermined location on one side of another harness and attached at a second distal end to a first end of a first adjustable strap and comprising a first leash attachment ring;
a second Martingale assembly attached at a first end to a second predetermined location on the other side of the another harness and attached at a second distal end to a second distal end of the first adjustable strap and comprising a second leash attachment ring;
the first adjustable strap coupled to the first and second Martingale assemblies; and
further comprising the another harness. which comprises:
a second adjustable strap for looping around the chest of the animal attached at a first end to a first ring and at a second distal end to a second ring; and
a third adjustable strap for looping around the back of the animal attached at a first end to the first ring and at a second distal end to the second ring; wherein
when the another harness and the animal harness assembly are worn by the animal the animal harness assembly is situated proximate the animal's collar bone and motion of the animal either to the left or right away from a user holding a leash attached to the animal harness assembly via at least one of the first Martingale assembly and the second Martingale assembly results in pressure being applied to one side of the animal;
the first predetermined location on one side of the another harness to which the first Martingale assembly is attached is the first ring; and
the second predetermined location on the other side of the another harness to which the second Martingale assembly is attached is the second ring.

9. The animal harness assembly according to claim 8, wherein
when the animal moves to the left away from the user the pressure is applied to the right side of the animal; and
when the animal moves to the right away from the user the pressure is applied to the left side of the animal.

10. The animal harness assembly according to claim 8, wherein in use the user holding the leash attached to the second harness assembly via at least one of the first leash attachment ring of the first Martingale assembly and the second leash attachment ring of the second Martingale assembly is beside or behind the animal.

11. The animal harness assembly according to claim 8, wherein the second adjustable strap comprises a buckle.

12. The animal harness assembly according to claim 8, wherein
the second adjustable strap comprises a first adjustment buckle;
the third adjustable strap comprises a second adjustment buckle; and
the first adjustable strap comprises a third adjustment buckle.

13. The animal harness assembly according to claim 8, wherein
the first adjustable strap fits across the front of the animal above its shoulders.

* * * * *